(12) United States Patent
Korayem et al.

(10) Patent No.: US 12,351,192 B2
(45) Date of Patent: Jul. 8, 2025

(54) METHODS AND SYSTEMS FOR VEHICULAR WEIGHT-RELATED PARAMETER ESTIMATION

(71) Applicant: GM GLOBAL TECHNOLOGY OPERATIONS LLC, Detroit, MI (US)

(72) Inventors: Amin Habibnejad Korayem, Markham (CA); Hasan Alper Hepguvendik, Milton (CA); Mansoor Alghooneh, Mansoor (CA); Joseph K Moore, Whitby (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 303 days.

(21) Appl. No.: 18/298,460

(22) Filed: Apr. 11, 2023

(65) Prior Publication Data

US 2024/0343256 A1    Oct. 17, 2024

(51) Int. Cl.
| | |
|---|---|
| *B60W 40/13* | (2012.01) |
| *B60K 35/00* | (2024.01) |
| *B60K 35/22* | (2024.01) |
| *B60K 35/28* | (2024.01) |

(52) U.S. Cl.
CPC ............. *B60W 40/13* (2013.01); *B60K 35/00* (2013.01); *B60K 35/22* (2024.01); *B60K 35/28* (2024.01); *B60K 2360/167* (2024.01); *B60W 2300/14* (2013.01); *B60W 2520/105* (2013.01)

(58) Field of Classification Search
CPC ............. B60W 40/13; B60W 2300/14; B60W 2520/105; B60K 35/00; B60K 35/28; B60K 2360/167; B60K 35/22
See application file for complete search history.

(56) References Cited

U.S. PATENT DOCUMENTS

| | | | | |
|---|---|---|---|---|
| 4,728,922 | A * | 3/1988 | Christen ................ | G01G 19/08 177/136 |
| 11,787,418 | B1* | 10/2023 | Gudeta ............... | B60W 40/107 701/1 |
| 2020/0156650 | A1* | 5/2020 | Kretschmann ......... | G01G 19/12 |
| 2021/0304609 | A1* | 9/2021 | Nielsen ................ | G08G 1/0133 |

FOREIGN PATENT DOCUMENTS

| | | |
|---|---|---|
| DE | 102019121716 A1 | 2/2020 |
| DE | 102019114259 A1 | 12/2020 |
| DE | 102022201560 A1 | 12/2022 |
| DE | 102022116115 A1 | 1/2023 |

\* cited by examiner

*Primary Examiner* — Naeem Taslim Alam
(74) *Attorney, Agent, or Firm* — Lorenz & Kopf LLP

(57) ABSTRACT

Methods and systems are provided for estimating weight-related parameter values of a vehicle. The system includes a sensor system, a display device, and a controller configured to, by a processor, receive, from the sensor system, static sensor data sensed while the vehicle is stationary and coupled to a trailer and dynamic sensor data while the vehicle is being driven and not coupled to the trailer, wherein the static sensor data includes a deflection value associated with a suspension system of the vehicle, estimate, while the vehicle is stationary, one or more weight-related parameter values using a suspension model and the static sensor data, determine degradation of the suspension system over time using a suspension sag estimation model and the dynamic sensor data, update the suspension model to accommodate for the degradation of the suspension system, and display the one or more weight-related parameter values on the visual display.

20 Claims, 4 Drawing Sheets

METHODS AND SYSTEMS FOR VEHICULAR WEIGHT-RELATED PARAMETER ESTIMATION

INTRODUCTION

The technical field generally relates to vehicles and trailers towed thereby, and more particularly relates to systems and methods for estimating various weight-related parameter values of a vehicle coupled to a trailer while the vehicle is stationary.

Various weight-related parameter values may be valuable when loading and towing a trailer with a vehicle. For example, total vehicle weight, tongue load, and front/rear axle loads restoration values can be used to ensure that trailers are safely loaded and coupled to the vehicle. Various modern vehicles include systems capable of estimating one or more weight-related parameter values to assist in these activities. However, these systems may become less accurate over time due to various aspects associated with the vehicle. For example, many of these systems relay on suspension displacement measurements to estimate the weight-related parameter values. Over time, various components of the suspension system of the vehicle, such as the shock absorbers, struts, springs, bushings, and ball joints, can become worn or damaged due to the stresses of driving, exposure to harsh weather conditions, and other factors. This degradation may lead to inaccurate estimates of the weight-related parameter values.

Accordingly, it is desirable to provide systems and methods capable of accurately estimating weight-related parameter values relevant to the loading and towing of trailers. In addition, it is desirable to promote accurate results of these systems and methods by compensating for any suspension degradation. Furthermore, other desirable features and characteristics of the present invention will become apparent from the subsequent detailed description and the appended claims, taken in conjunction with the accompanying drawings and the foregoing technical field and background.

SUMMARY

A method is provided for estimating weight-related parameter values of a vehicle. In one embodiment, the method includes receiving, from a sensor system of the vehicle, static sensor data sensed while the vehicle is stationary and coupled to a trailer and dynamic sensor data while the vehicle is being driven and not coupled to the trailer, wherein the static sensor data includes a deflection value associated with a suspension system of the vehicle, estimating, with a processor operably coupled to the sensor system and while the vehicle is stationary, one or more weight-related parameter values using a suspension model and the static sensor data, determining, with the processor, degradation of the suspension system over time using a suspension sag estimation model and the dynamic sensor data, updating, with the processor, the suspension model to accommodate for the degradation of the suspension system, and displaying the one or more weight-related parameter values on a display device of the vehicle.

In various embodiments, the weight-related parameter values include a total vehicle weight value, tongue load value of the trailer, and a front/rear axle loads restoration value.

In various embodiments, the suspension model utilizes nonlinear load deflection representation with variable switching points.

In various embodiments, the method includes estimating, with the processor, a static estimated weight value of the vehicle using the suspension model, estimating, with the processor, a dynamic estimated weight value of the vehicle with a dynamic model and the dynamic sensor data, wherein the dynamic sensor data includes an acceleration value of the vehicle, and determining, with the processor, a fused estimated weight value of the vehicle by fusing the static estimated weight value and the dynamic estimated weight value.

In various embodiments, the step of determining the degradation of the suspension system over time using the suspension sag estimation model includes comparing, with the processor, the fused estimated weight value and the static estimated weight value.

In various embodiments, the method includes receiving, from the sensor system, one or more weight-related values directly sensed on the vehicle, and training, with the processor, the dynamic model using the one or more weight-related values.

In various embodiments, the method includes receiving, from the sensor system, a first longitudinal acceleration value of the vehicle, a first drive force value of the vehicle, and a first brake pressure value of the vehicle all sensed at a first time while the vehicle is being driven, receiving, from the sensor system, a second longitudinal acceleration value of the vehicle, a second drive force value of the vehicle, and a second brake pressure value of the vehicle all sensed at a second time, wherein a velocity of the vehicle is the same at the first time and the second time while the vehicle is being driven, and estimating, with the processor, the dynamic estimated weight value of the vehicle using the dynamic model and the first longitudinal acceleration value, the first drive force value, the first brake pressure value, the second longitudinal acceleration value, the second drive force value, and the second brake pressure value, wherein the dynamic model includes a variational-based vehicle longitudinal model.

In various embodiments, the variational-based vehicle longitudinal model only uses a subset of the dynamic sensor data that is obtained while the velocity of the vehicle is greater than a threshold velocity and while the vehicle is traveling in a straight, forward direction.

In various embodiments, the method includes receiving, from the sensor system, one or more external weight values associated with objects separate from and supported by the vehicle, wherein the dynamic model is configured to accommodate for the one or more external weight values.

A system is provided for estimating weight-related parameter values of a vehicle. In one embodiment, the system includes a sensor system having one or more sensors configured to sense measurable conditions internal and external to the vehicle, a display device configured to generate a visual display, a controller operably coupled to the sensor system and the display device, the controller configured to, by a processor, receive, from the sensor system, static sensor data sensed while the vehicle is stationary and coupled to a trailer and dynamic sensor data while the vehicle is being driven and not coupled to the trailer, wherein the static sensor data includes a deflection value associated with a suspension system of the vehicle, estimate, while the vehicle is stationary, one or more weight-related parameter values using a suspension model and the static sensor data, determine degradation of the suspension system over time using a suspension sag estimation model and the dynamic sensor data, update the suspension model to accommodate for the degradation of the suspension system, and display the one or more weight-related parameter values on the visual display.

In various embodiments, the weight-related parameter values include a total vehicle weight value, tongue load value of the trailer, and a front/rear axle loads restoration value.

In various embodiments, the suspension model utilizes nonlinear load deflection representation with variable switching points.

In various embodiments, the controller is configured to, by the processor, estimate a static estimated weight value of the vehicle using the suspension model, estimate a dynamic estimated weight value of the vehicle with a dynamic model and the dynamic sensor data, wherein the dynamic sensor data includes an acceleration value of the vehicle, and determine a fused estimated weight value of the vehicle by fusing the static estimated weight value and the dynamic estimated weight value.

In various embodiments, the suspension sag estimation model is configured to compare the fused estimated weight value and the static estimated weight value.

In various embodiments, the controller is configured to, by the processor, receive, from the sensor system, one or more weight-related values directly sensed on the vehicle, and train the dynamic model using the one or more weight-related values.

In various embodiments, the controller is configured to, by the processor, receive, from the sensor system, a first longitudinal acceleration value of the vehicle, a first drive force value of the vehicle, and a first brake pressure value of the vehicle all sensed at a first time while the vehicle is being driven, receive, from the sensor system, a second longitudinal acceleration value of the vehicle, a second drive force value of the vehicle, and a second brake pressure value of the vehicle all sensed at a second time, wherein a velocity of the vehicle is the same at the first time and the second time while the vehicle is being driven, and estimate the dynamic estimated weight value of the vehicle using the dynamic model and the first longitudinal acceleration value, the first drive force value, the first brake pressure value, the second longitudinal acceleration value, the second drive force value, and the second brake pressure value, wherein the dynamic model includes a variational-based vehicle longitudinal model.

In various embodiments, the variational-based vehicle longitudinal model is configured to only use a subset of the dynamic sensor data that is obtained while the velocity of the vehicle is greater than a threshold velocity and while the vehicle is traveling in a straight, forward direction.

In various embodiments, the controller is configured to, by the processor, receive, from the sensor system, one or more external weight values associated with objects separate from and supported by the vehicle, and the dynamic model is configured to accommodate for the one or more external weight values.

A vehicle is provided that includes a body, a suspension system configured to support the body, a sensor system having one or more sensors configured to sense measurable conditions internal and external to the body, a display device configured to generate a visual display, a controller operably coupled to the sensor system and the display device, the controller configured to, by a processor, receive, from the sensor system, static sensor data sensed while the vehicle is stationary and coupled to a trailer and dynamic sensor data while the vehicle is being driven and not coupled to the trailer, wherein the static sensor data includes a deflection value associated with the suspension system, estimate, while the vehicle is stationary, one or more weight-related parameter values using a suspension model and the static sensor data, determine degradation of the suspension system over time using a suspension sag estimation model and the dynamic sensor data, update the suspension model to accommodate for the degradation of the suspension system, and display the one or more weight-related parameter values on the visual display, wherein the weight-related parameter values include a total vehicle weight value, tongue load value of the trailer, and a front/rear axle loads restoration value.

In various embodiments, the controller of the vehicle is configured to, by the processor, estimate a static estimated weight value of the vehicle using the suspension model, estimate a dynamic estimated weight value of the vehicle with a dynamic model and the dynamic sensor data, wherein the dynamic sensor data includes an acceleration value of the vehicle, and determine a fused estimated weight value of the vehicle by fusing the static estimated weight value and the dynamic estimated weight value. The suspension sag estimation model is configured to compare the fused estimated weight value and the static estimated weight value.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
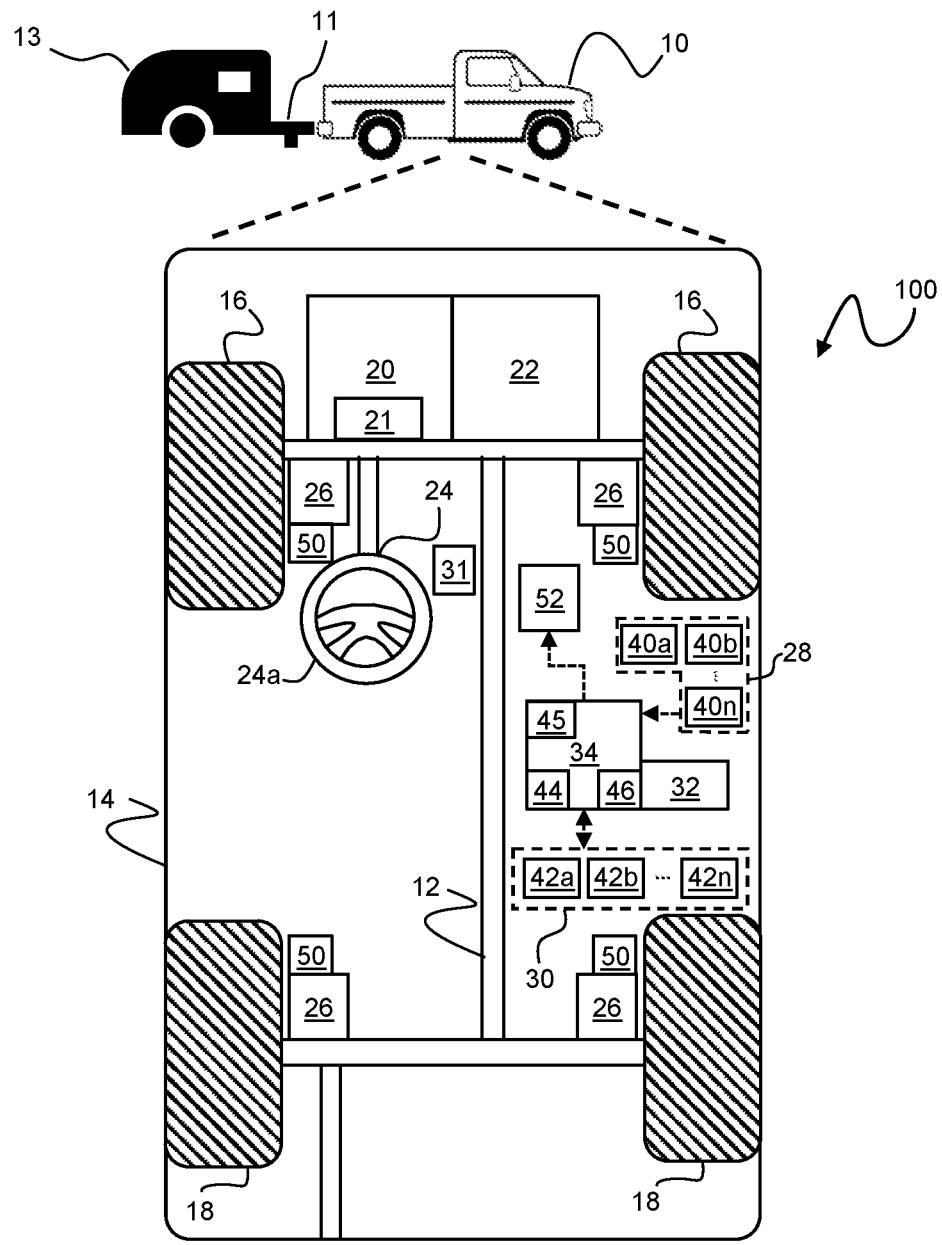
FIG. 1 is a functional block diagram of a vehicle that includes a weight estimation system, in accordance with various embodiments.

FIG. 1 illustrates a vehicle 10, according to an exemplary embodiment that includes a weight estimation system 100. In general, the system 100 estimates one or more weight-related parameter values associated with the vehicle 10 in a manner that compensates for suspension degradation over time. In various embodiments, the estimated weight-related parameter values include a total vehicle weight value, tongue load value of the trailer, and/or a front/rear axle loads restoration value. As used herein the total vehicle weight value, also referred to as the gross vehicle weight, refers to a measurement of a total weight of the vehicle 10 as well as external objects separate from the vehicle 10 that are supported by the vehicle 10, such as passengers and cargo. As used herein, the tongue load value, also referred to as the tongue weight, refers to a static force that a coupling device (e.g., tongue) of the trailer 13 exerts on the vehicle 10 (e.g., hitch ball). As used herein the front/rear axle loads restoration value refers to a percent recovery of a reduction of a weight distributed on a front axle of the vehicle 10 caused by load shift due to a weight applied on the coupling device of the vehicle 10 by the trailer 13 (i.e., the tongue load value).

In certain embodiments, the vehicle 10 comprises an automobile. In various embodiments, the vehicle 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In addition, in various embodiments, it will also be appreciated that the vehicle 10 may comprise any number of other types of mobile platforms.

In various embodiments, the vehicle 10 may be associated with the trailer 13 capable of hauling a load. As can be appreciated, the trailer 13 may be any type of towable application having one or more wheels and is not limited to any one embodiment. The vehicle 10 is configured to couple to and connect to the trailer 13 via a connection apparatus 11 and is configured to tow the trailer 13. In various embodiments, the connection apparatus 11 comprises a hitch. In various other embodiments, the connection apparatus 11 comprises one or more other types of systems, such as a gooseneck for a fifth wheel trailer, and so on. In various embodiments, the connection apparatus 11 further comprises a wiring harness configured to communicate power and/or communication signals to and from components of the trailer 13.

As depicted in FIG. 1, the exemplary vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

The vehicle 10 further includes a propulsion system 20, the transmission system 22, a steering system 24, a brake system 26, a sensor system 28, an actuator system 30, at least one data storage device 32, at least one controller 34, a suspension system 50, and a display system 52. The propulsion system 20 includes an engine 21, such as a gasoline or diesel fueled combustion engine, an electric engine, or a hybrid engine.

The transmission system 22 is configured to transmit power from the propulsion system 20 to the wheels 16-18 according to selectable speed ratios based on a range selection received from a human-machine interface, for example, a range selection device (e.g., gear selector, gear shifter, PRNDL, etc.) configured to select an operating range (e.g., gear ratio).

The steering system 24 influences a position of the wheels 16-18. While depicted as including a steering wheel 24a for illustrative purposes, in some embodiments contemplated within the scope of the present disclosure, the steering system 24 may not include a steering wheel.

The brake system 26 is configured to provide braking torque to the wheels 16-18. The brake system 26 may, in various embodiments, include friction brakes, brake by wire, a regenerative braking system such as an electric machine, and/or other appropriate braking systems. In one example, the vehicle 10 includes a brake pedal 31, which is movable by the operator from a released position into a depressed position to activate the brake system 26 to apply the braking torque.

The suspension system 50 couples the frame to the wheels 16 and 18, for example, via axles, and is configured to absorb shocks and vibrations from the road and minimize the transfer of these forces to the vehicle body and passengers. The suspension system 50 may include various components including but not limited to springs (e.g., coil springs, leaf springs, torsion bars, etc.), dampers (i.e., shock absorbers), anti-roll bars, control arms, bushings, etc. Typically, the suspension system 50 couples with the frame at four locations each adjacent a corner of the frame and/or a corresponding one of the wheels 16 and 18.

The display system 52 may include various components including a display screen configured to render a visual display. In various embodiments, the display system 52 may include a human-to-machine interface (HMI) such as a touchscreen display.

The sensor system 28 includes one or more sensing devices 40a-40n that sense observable conditions of the exterior environment, the interior environment, and/or a status or condition of a corresponding component of the vehicle 10 and provide such condition and/or status to other systems of the vehicle 10, such as the controller 34. It should be understood that the vehicle 10 may include any number of the sensing devices 40a-40n. The sensing devices 40a-40n can include, but are not limited to, inertia measuring sensors, vehicle speed sensors, weight sensors, torque sensors, wheel speed sensor, engine torque sensor, suspension deflection measurement sensor, ultra-sonic sensor, laser displacement sensor, infrared light sensor, camera vision sensor, steering wheel angle sensor, brake pressure sensor, pedal position sensor, strain gages, seat sensor, fuel level sensor, etc.

The actuator system 30 includes one or more actuator devices 42a-42n that control one or more vehicle features such as, but not limited to, the propulsion system 20, the transmission system 22, the steering system 24, and the brake system 26. In various embodiments, the vehicle 10 may also include interior and/or exterior vehicle features not illustrated in FIG. 1, such as various doors, a trunk, and cabin features such as air, music, lighting, touch-screen display components, and the like.

The data storage device 32 stores data for use in controlling the vehicle 10 and/or systems and components thereof. As can be appreciated, the data storage device 32 may be part of the controller 34, separate from the controller 34, or part of the controller 34 and part of a separate system. The data storage device 32 can be any suitable type of storage apparatus, including various different types of direct access storage and/or other memory devices. In one exemplary embodiment, the data storage device 32 comprises a program product from which a computer readable memory device can receive a program that executes one or more embodiments of one or more processes of the present disclosure, such as the steps of the process discussed further below in connection with FIGS. 3-7. In another exemplary embodiment, the program product may be directly stored in and/or otherwise accessed by the memory device and/or one or more other disks and/or other memory devices.

The controller 34 includes at least one processor 44, a communication bus 45, and a computer readable storage device or media 46. The processor 44 performs the computation and control functions of the controller 34. The processor 44 can be any custom made or commercially available processor, a central processing unit (CPU), a graphics processing unit (GPU), an auxiliary processor among several processors associated with the controller 34, a semiconductor-based microprocessor (in the form of a microchip or chip set), a macro-processor, any combination thereof, or generally any device for executing instructions. The computer readable storage device or media 46 may include volatile and nonvolatile storage in read-only memory (ROM), random-access memory (RAM), and keep-alive memory (KAM). For example, KAM is a persistent or non-volatile memory that may be used to store various operating variables while the processor 44 is powered down. The computer-readable storage device or media 46 may be implemented using any number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10. The bus 45 serves to transmit programs, data, status and other information or signals between the various components of the vehicle 10. The bus 45 can be any suitable physical or logical means of connecting computer systems and components. This includes, but is not limited to, direct hard-wired connections, fiber optics, infrared, and wireless bus technologies.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms, and generate data based on the logic, calculations, methods, and/or algorithms. Although only one controller 34 is shown in FIG. 1, embodiments of the vehicle 10 can include any number of controllers 34 that communicate over any suitable communication medium or a combination of communication mediums that cooperate to process the sensor signals, perform logic, calculations, methods, and/or algorithms, and generate data.

As can be appreciated, that the controller 34 may otherwise differ from the embodiment depicted in FIG. 1. For example, the controller 34 may be coupled to or may otherwise utilize one or more remote computer systems and/or other control systems, for example as part of one or more of the above-identified vehicle devices and systems. It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 44) to perform and execute the program. Such a program product may take a variety of forms, and the present disclosure applies equally regardless of the particular type of computer-readable signal bearing media used to carry out the distribution. Examples of signal bearing media include recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 34 may also otherwise differ from the embodiment depicted in FIG. 1, for example in that the computer system of the controller 34 may be coupled to or may otherwise utilize one or more remote computer systems and/or other control systems.

Figure 2:
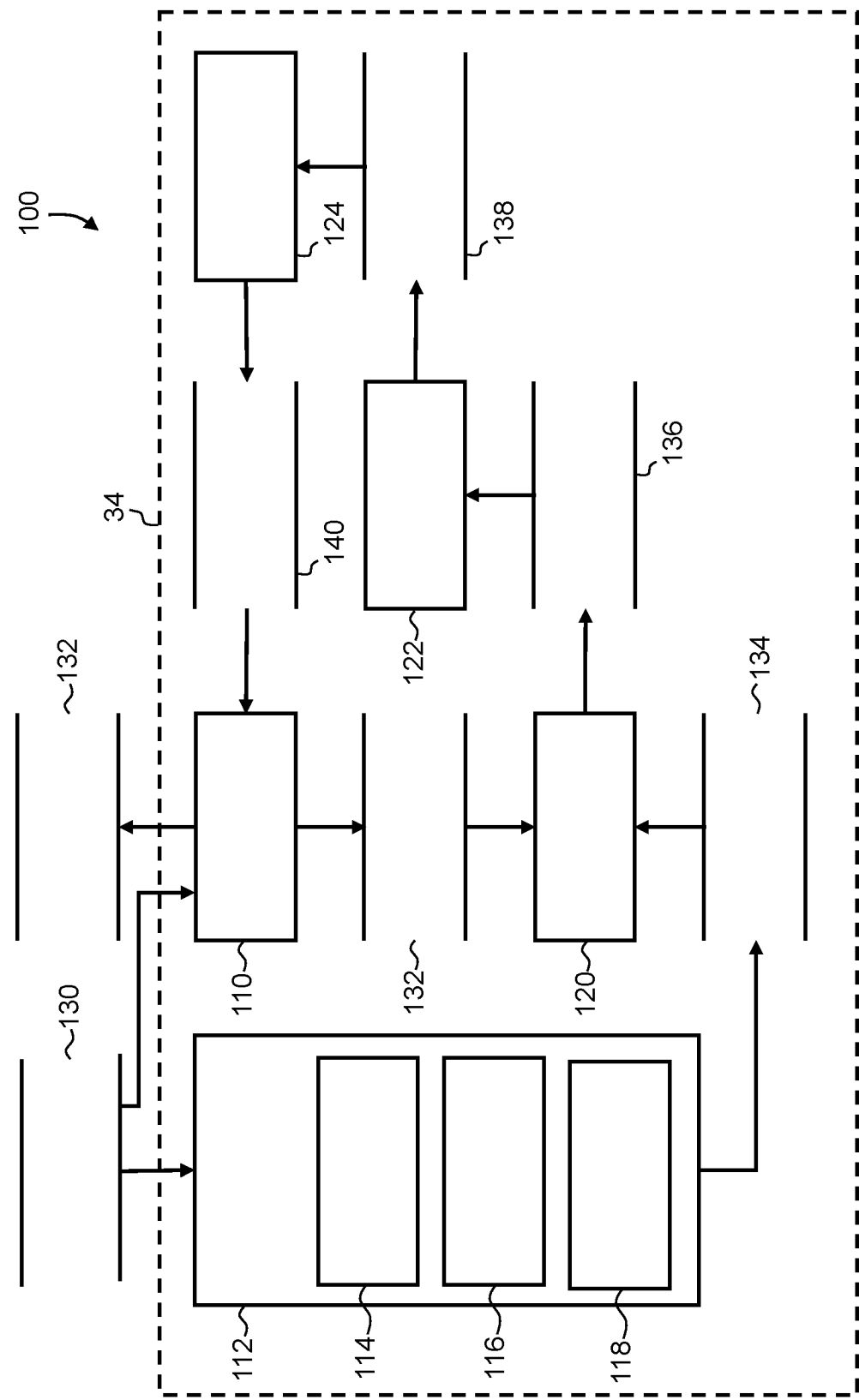
FIG. 2 is a dataflow diagram illustrating elements of the of system of the vehicle of FIG. 1, in accordance with various embodiments.

With reference to FIG. 2 and with continued reference to FIG. 1, a dataflow diagram illustrates elements of the weight estimation system 100 of FIG. 1 in accordance with various embodiments. As can be appreciated, various embodiments of the system 100 according to the present disclosure may include any number of modules embedded within the controller 34 which may be combined and/or further partitioned to similarly implement systems and methods described herein. Furthermore, inputs to the system 100 may be received from other control modules (not shown) associated with the vehicle 10, and/or determined/modeled by other sub-modules (not shown) within the controller 34. Furthermore, the inputs might also be subjected to preprocessing, such as sub-sampling, noise-reduction, normalization, feature-extraction, missing data reduction, and the like. In various embodiments, the system 100 includes a static estimation module 110, a dynamic estimation module 112, a fusion module 120, a suspension sag module 122, and a saturation module 124.

In various embodiments, the static estimation module 110 receives as input sensor data 130 generated by the sensor system 28. The sensor data 130 includes various data indicating observable conditions of environments internal and/or external to the vehicle 10. In various embodiments, the sensor data 130 include static sensor data sensed while the vehicle 10 was stationary. In various embodiments, the sensor data 130 includes deflection measurements associated with the suspension system 50.

The static estimation module 110 estimates weight-related parameter values associated with the vehicle 10 based on the sensor data 130. In various embodiments, the static estimation module 110 includes a suspension model configured to estimates weight-related parameter values based on deflection measurements associated with the suspension system 50. In various embodiments, the estimated weight-related parameter values include a total vehicle weight value, tongue load value of the trailer 13, and a front/rear axle loads restoration value. The static estimation module 110 generates static data 132 that includes various data indicating the estimated weight-related parameter values. In various embodiments, the static estimation module 110 transmits the static data 132 to the display device of the display system 52 such that the estimated weight-related parameter values are rendered on the visual display.

In various embodiments, the dynamic estimation module 112 receives as input the sensor data 130 generated by the sensor system 28. In various embodiments, the sensor data 130 include dynamic sensor data sensed while the vehicle 10 was being driven. In various embodiments, the sensor data 130 includes longitudinal acceleration measurements, drive force measurements, and brake pressure measurements.

The dynamic estimation module 112 performs estimates of weight-related parameter values associated with the vehicle 10 based on the sensor data 130. In various embodiments, the dynamic estimation module 112 includes a vehicle model 114, various conditions and enablers 116, and a variational-based vehicle mass estimator 118. The vehicle model 114 may include a vehicle longitudinal model, a vehicle lateral model, and/or a vehicle longitudinal and lateral model to perform the dynamic weight-related parameter estimations. In various embodiments, the dynamic estimation module 112 is configured to estimate weight-related parameter values based on longitudinal acceleration measurements, drive force measurements, and brake pressure measurements. In various embodiments, the estimated weight-related parameter values include a total vehicle weight value. The dynamic estimation module 112 generates dynamic data 134 that includes various data indicating the estimated weight-related parameter values.

In various embodiments, the fusion module 120 receives as input the static data 132 generated by the static estimation module 110 and the dynamic data 134 generated by the dynamic estimation module 112. The fusion module 120 performs a fusion process to fuse the static data 132 and the dynamic data 134. Various fusion processes may be used by the fusion module 120, including but not limited to a simple averaging of values, Bayesian fusion, Temporal based fusion, and Dempster-Shafter theory of evidence. The fusion module 120 generates fusion data 136 that includes various data indicating the fused static data 132 and dynamic data 134.

In various embodiments, the suspension sag module 122 receives as input the static data 132 generated by the static estimation module 110 and the fusion data 136 generated by the fusion module 120. The suspension sag module 122 performs an analysis of the static data 132 and the fusion data 136 to estimate degradation of the suspension system 50. In various embodiments, the suspension sag module 122 may determine a difference in suspension deflection between the static data 132 and the fusion data 136 and attribute some or all of the difference in deflection to suspension degradation. The suspension sag module 122 generates suspension sag data 138 that includes various data indicating the estimated degradation of the suspension system 50, for example, an amount of deflection associated with degradation over time.

In various embodiments, the saturation module 124 receives as input the suspension sag data 138 generated by the suspension sag module 122. The saturation module 124 is configured to determine if and when the static estimation module 110 should be updated using the suspension sag data 138. In various embodiments, the saturation module 124 may periodically update the static estimation module 110 after the vehicle 10 has traveled a predetermined distance (e.g., every 2000 km). In various embodiments, the saturation module 124 may periodically update the static estimation module 110 after the suspension sag module 122 has estimated a predetermined amount of degradation (e.g., every 1 mm). The saturation module 124 generates saturation data 140 including various data that indicates that the static estimation module 110 should be updated and the associated degradation values provided in the suspension sag data 138. Upon a determination that the static estimation module 110 should be updated, the saturation module 124 may transmit the saturation data 140 to the static estimation module 110.

Figure 3:
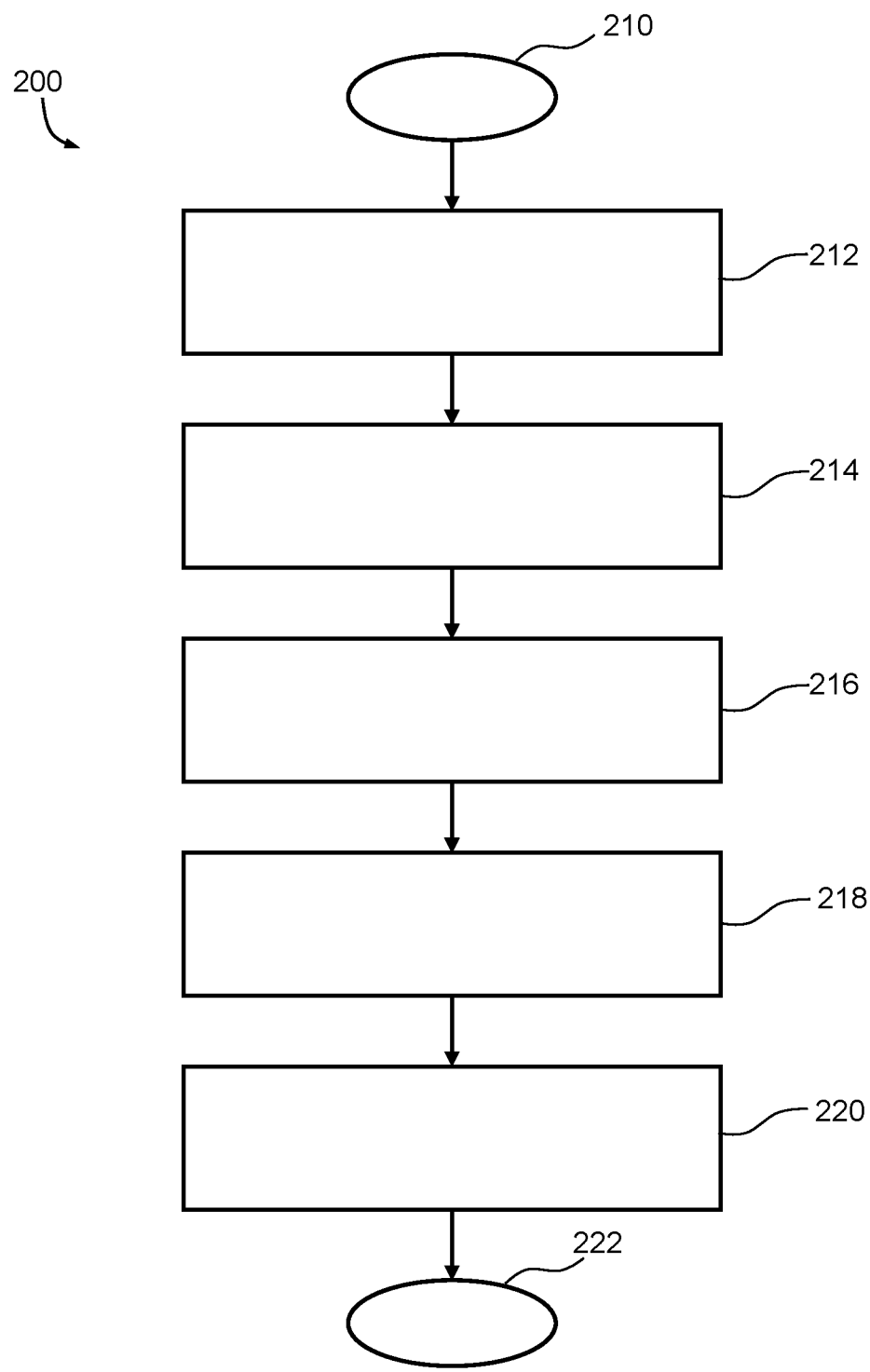
FIG. 3 is a flowchart of a method for estimating weight-related parameter values as performed by the system of the vehicle of FIGS. 1 and 2, in accordance with exemplary embodiments.

With reference now to FIG. 3 and with continued reference to FIGS. 1-2, a flowchart provides a method 200 for estimating various weight-related parameter values for the vehicle 10 as performed by the weight estimation system 100, in accordance with exemplary embodiments. As can be appreciated in light of the disclosure, the order of operation within the method 200 is not limited to the sequential execution as illustrated in FIG. 3, but may be performed in one or more varying orders as applicable and in accordance with the present disclosure. In various embodiments, the method 200 can be scheduled to run based on one or more predetermined events, and/or can run continuously during operation of the vehicle 10.

In one example, the method 200 may begin at 210. At 212, the method 200 includes receiving, from the sensor system 28 of the vehicle 10, static sensor data sensed while the vehicle 10 is stationary both prior to and the trailer 13 is coupled thereto and dynamic sensor data while the vehicle 10 is being driven both with and without the trailer 13 coupled thereto. The static sensor data includes a deflection value associated with a suspension system (e.g., the suspension system 50) of the vehicle 10. The deflection value may include a measured dimension indicating a difference of a position of a component of the suspension system 50 in loaded and unloaded conditions. For example, a spring may be compressed by a measured dimension upon coupling the trailer 13 to the vehicle 10.

At 214, the method 200 includes estimating, with a processor (e.g., the processor 44) operably coupled to the sensor system 28 and while the vehicle 10 is stationary, one or more weight-related parameter values using a suspension model and the static sensor data. For example, a comparison of the data prior to and after coupling the trailer 13 to the vehicle 10 may be used to estimate the trailer tongue load. At 216, the method 200 includes determining, with the processor, degradation of the suspension system 50 over time using a suspension sag estimation model and the dynamic sensor data. In various embodiments, the dynamic sensor data obtained while the trailer 13 is coupled to the vehicle 10 may be used to estimate load without any "stiction" noise. In various embodiments, the dynamic sensor data obtained while the trailer 13 is not coupled to the vehicle 10 may be used with the fusion model for updating the suspension model. At 218, the method 200 includes updating, with the processor, the suspension model to accommodate for the degradation of the suspension system 50. At 220, the method 200 includes displaying the one or more weight-related parameter values on a display device (e.g., the display device of the display system 52) of the vehicle 10. At 222, the method 200 may end.

Figure 4:
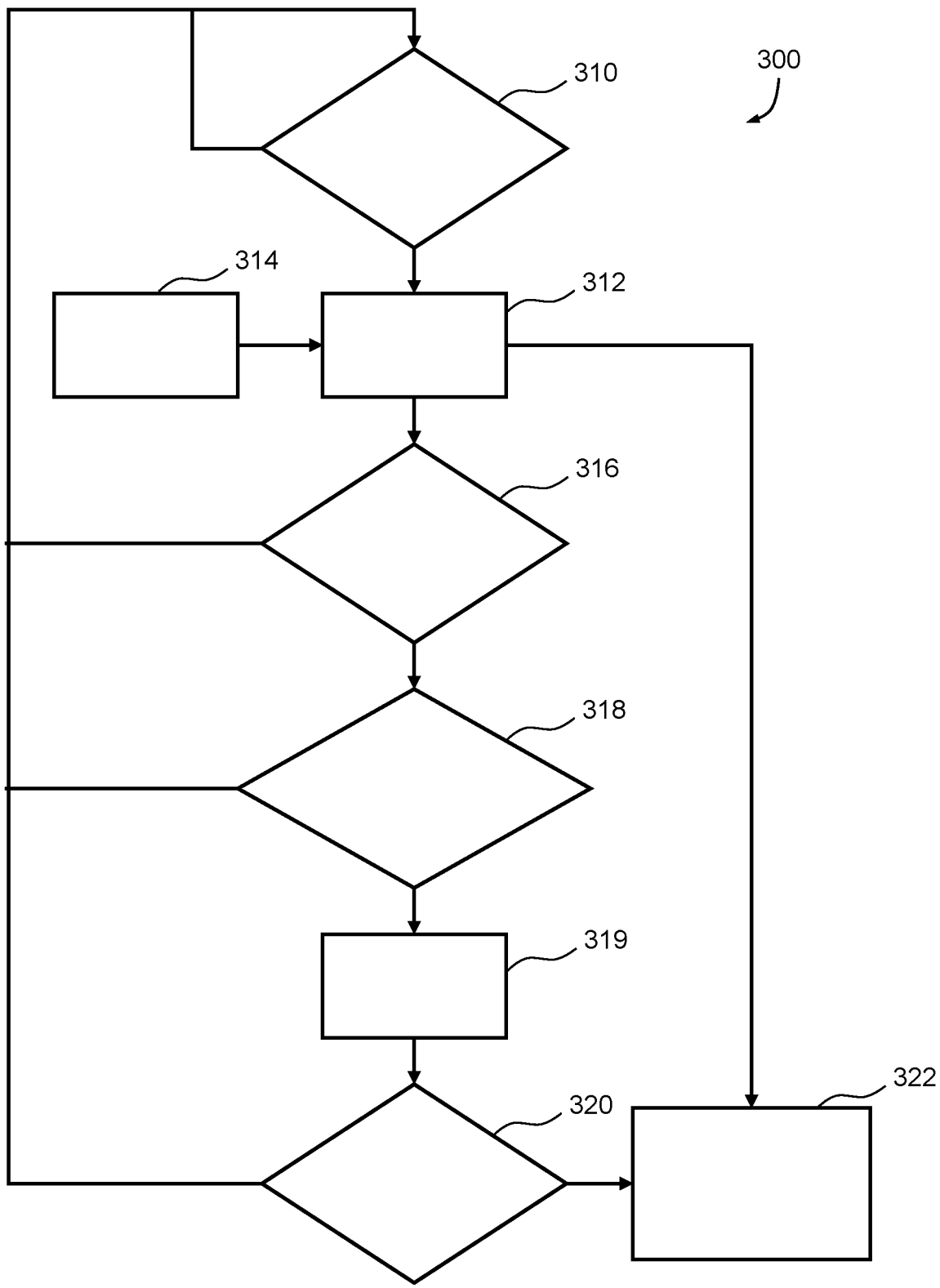
FIG. 4 is a flowchart of a method for enabling a dynamic vehicle model as performed by the system of the vehicle of FIGS. 1 and 2, in accordance with exemplary embodiments.

With reference now to FIG. 4 and with continued reference to FIGS. 1-3, a flowchart provides a method 300 for filtering sensor data, for example, with the conditions and enabler 116 of FIG. 2, for the vehicle 10, as performed by the weight estimation system 100, in accordance with exemplary embodiments. While performing the method 300, the system 100 determines whether the sensor data was sensed under certain conditions associated with various preprogrammed filtering criteria. At 310, the method 300 includes determining whether the velocity of the vehicle 10 was greater than a threshold velocity when the sensor data was sensed. For example, the velocity threshold may be 10 m/s and the method 300 may exclude all sensor data sensed while the vehicle 10 was traveling at or below 10 m/s.

If the velocity is determined to have been below the velocity threshold at 310, the method 300 continues to monitor the velocity of the vehicle 10. If the velocity of the vehicle 10 was above the velocity threshold at 310, the method 300 includes determining an initial weight of the vehicle at 312. In various embodiments, the method 300 may compensate for the weight of external objects (e.g., contents of a fuel tank) at 314. At 316, the method 300 includes determining whether a trailer (e.g., the trailer 13) is coupled to the vehicle 10. If the trailer is coupled to the vehicle 10 at 316, the method 300 returns to monitor the velocity of the vehicle 10 at 310.

If the trailer is not coupled to the vehicle 10 at 316, the method 300 includes determining whether the vehicle 10 is traveling in a straight, forward direction and accelerating (i.e., not decelerating). If the vehicle 10 is not traveling in a straight, forward direction and accelerating at 318, the method 300 returns to monitor the velocity of the vehicle 10 at 310.

If the vehicle 10 is traveling in a straight, forward direction and accelerating at 318, the method 300 includes storing at 319 a plurality of sensed data points based on the sensor data obtained by the sensor system 28. At 320, the method 300 includes determining whether a quantity of data points stored at 319 exceed a minimum data point threshold. If the data points of the sensor data do not exceed the minimum data point threshold at 320, the method 300 returns to monitor the velocity of the vehicle 10 at 310 and continues to collect sensor data and monitor the quantity of the data points thereof. If the data points of the sensor data do exceed the minimum data point threshold at 320, the method 300 includes performing a variational-based vehicle weight estimation, for example, with the variational-based vehicle mass estimator 118 of FIG. 2.

Notably, the method 300 may include fewer or more filter criteria. In various embodiments, the method 300 includes filtering the sensor data based on a bank angle of the vehicle 10, a slope of the surface on which the vehicle 10 is traveling, a status of the sensor system 28, etc.

In various embodiments, the estimated weight-related parameter values may be used by various autonomous and semi-autonomous driving systems of the vehicle 10.

As a nonlimiting example, the vehicle model 114 may include obtaining dynamic sensor data at two separate points in time while the vehicle 10 is traveling in a straight, forward direction and at the same velocity. The dynamic sensor data obtained at these two points in time include sensed longitudinal acceleration measurements, drive force measurements, and brake pressure measurements. The vehicle model 114 may implement a longitudinal variation-based model to determine the total vehicle weight value using, for example, equation (1) below.

$$M(\Delta a_x) = \Delta F_{drive} - K_b \Delta P_b, \quad \text{eq. (1)}$$

where, $$\Delta a_x = a_{x_A} - a_{x_B}$$

$$\Delta P_b = P_{b_A} - P_{b_B}$$

wherein M is the total vehicle weight, $a_x$ is the vehicle longitudinal acceleration, $F_{drive}$ is the drive force, $K_b$ is the lumped brake coefficient, and $P_b$ is the brake pressure.

The variational-based vehicle mass estimator 118 may use the total vehicle weight (M) determined by the longitudinal variation-based model using, for example, equations (2)-(5) below.

From the Longitudinal Variation-Based Model:

$$\phi \hat{M}_D = Z \quad \text{eq. (2)}$$

Output Signal Z:

$$Z = \Delta F = \begin{cases} -F_{b,B} - F_{d,A} & Accel \rightarrow Decel \\ F_{b,B} + F_{d,A} & Decel \rightarrow Accel \\ -F_{d,A} & Accel \rightarrow \text{Coasting} \end{cases} \quad \text{eq. (3)}$$

Regression Signal $\phi$:

$$\phi = \Delta a_x \quad \text{eq. (4)}$$

Estimation Method (Recursive Least Square):

$$\hat{x}_{k+1} = \hat{x}_k + K_{k+1}(Z_{k+1} - \phi_{k+1}\hat{x}_k) \quad \text{eq. (5)}$$

$$K_{k+1} = \frac{P_k \phi_{k+1}}{\lambda + \phi_{k+1} P_k \phi_{k+1}}$$

$$P_{k+1} = (1 - K_{k+1}\phi_{k+1})p_k/\lambda$$

Although the examples above are described in relation to dynamic sensor data obtained at two separate points in time, the same or similar methods may be used for dynamic sensor data obtained at a plurality of points in time.

The systems and methods herein provide various benefits for vehicles configured for towing trailers. In particular, providing weight-related parameter values to an operator may promote safety and ease of loading and towing. As an example, providing the total vehicle weight value promotes proper trailer loading and can be an important factor in determining how to operate the vehicle. As another example, providing the tongue load value of the trailer promotes maintaining trailer loading within a safe range. Specifically, too little weight exerted by the trailer tongue may cause swaying from side to side during towing making it difficult to control. Conversely, too much weight exerted by the trailer tongue may cause overloading of the rear tires of the tow vehicle and push the rear end of the vehicle around, potentially negatively affect handling (e.g., poor turning and braking). As another example, providing the front/rear axle loads restoration value may promote proper distribution of weight between the axles. In addition, accurate estimation of weight-related parameter values can promote the functionality of various autonomous and semi-autonomous driving system, and/or promote optimization of power distribution in certain vehicles.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for estimating weight-related parameter values of a vehicle, the method comprising:
   receiving, from a sensor system of the vehicle, static sensor data sensed while the vehicle is stationary and coupled to a trailer and dynamic sensor data while the vehicle is being driven and not coupled to the trailer, wherein the static sensor data includes a deflection value associated with a suspension system of the vehicle;
   estimating, with a processor operably coupled to the sensor system and while the vehicle is stationary, one or more weight-related parameter values using a suspension model and the static sensor data;
   determining, with the processor, degradation of the suspension system over time using a suspension sag estimation model and the dynamic sensor data;
   updating, with the processor, the suspension model to accommodate for the degradation of the suspension system; and
   displaying the one or more weight-related parameter values on a display device of the vehicle.

2. The method of claim 1, wherein the one or more weight-related parameter values include a total vehicle weight value, a tongue load value of the trailer, and a front/rear axle loads restoration value.

3. The method of claim 1, wherein the suspension model utilizes nonlinear load deflection representation with variable switching points.

4. The method of claim 1, further comprising:
   estimating, with the processor, a static estimated weight value of the vehicle using the suspension model;
   estimating, with the processor, a dynamic estimated weight value of the vehicle with a dynamic model and the dynamic sensor data, wherein the dynamic sensor data includes an acceleration value of the vehicle; and
   determining, with the processor, a fused estimated weight value of the vehicle by fusing the static estimated weight value and the dynamic estimated weight value.

5. The method of claim 4, wherein the step of determining the degradation of the suspension system over time using the suspension sag estimation model includes comparing, with the processor, the fused estimated weight value and the static estimated weight value.

6. The method of claim 4, further comprising:
   receiving, from the sensor system, one or more weight-related values directly sensed on the vehicle; and
   training, with the processor, the dynamic model using the one or more weight-related values.

7. The method of claim 4, further comprising:
   receiving, from the sensor system, a first longitudinal acceleration value of the vehicle, a first drive force value of the vehicle, and a first brake pressure value of the vehicle all sensed at a first time while the vehicle is being driven;
   receiving, from the sensor system, a second longitudinal acceleration value of the vehicle, a second drive force value of the vehicle, and a second brake pressure value of the vehicle all sensed at a second time, wherein a velocity of the vehicle is the same at the first time and the second time while the vehicle is being driven; and
   estimating, with the processor, the dynamic estimated weight value of the vehicle using the dynamic model and the first longitudinal acceleration value, the first drive force value, the first brake pressure value, the second longitudinal acceleration value, the second drive force value, and the second brake pressure value, wherein the dynamic model includes a variational-based vehicle longitudinal model.

8. The method of claim 7, wherein the variational-based vehicle longitudinal model uses a subset of the dynamic sensor data that is obtained while the velocity of the vehicle is greater than a threshold velocity and while the vehicle is traveling in a straight, forward direction.

9. The method of claim 4, further comprising receiving, from the sensor system, one or more external weight values associated with objects separate from and supported by the vehicle, wherein the dynamic model is configured to accommodate for the one or more external weight values.

10. A system for estimating weight-related parameter values of a vehicle, the system comprising:
    a sensor system having one or more sensors configured to sense measurable conditions internal and external to the vehicle;
    a display device configured to generate a visual display; and
    a controller operably coupled to the sensor system and the display device, the controller configured to, by a processor:
        receive, from the sensor system, static sensor data sensed while the vehicle is stationary and coupled to a trailer and dynamic sensor data while the vehicle is being driven and not coupled to the trailer, wherein the static sensor data includes a deflection value associated with a suspension system of the vehicle;
        estimate, while the vehicle is stationary, one or more weight-related parameter values using a suspension model and the static sensor data;
        determine degradation of the suspension system over time using a suspension sag estimation model and the dynamic sensor data;
        update the suspension model to accommodate for the degradation of the suspension system; and
    display the one or more weight-related parameter values on the visual display.

11. The system of claim 10, wherein the one or more weight-related parameter values include a total vehicle weight value, a tongue load value of the trailer, and a front/rear axle loads restoration value.

12. The system of claim 10, wherein the suspension model utilizes nonlinear load deflection representation with variable switching points.

13. The system of claim 10, wherein the controller is configured to, by the processor:
estimate a static estimated weight value of the vehicle using the suspension model;
estimate a dynamic estimated weight value of the vehicle with a dynamic model and the dynamic sensor data, wherein the dynamic sensor data includes an acceleration value of the vehicle; and
determine a fused estimated weight value of the vehicle by fusing the static estimated weight value and the dynamic estimated weight value.

14. The system of claim 13, wherein the suspension sag estimation model is configured to compare the fused estimated weight value and the static estimated weight value.

15. The system of claim 13, wherein the controller is configured to, by the processor:
receive, from the sensor system, one or more weight-related values directly sensed on the vehicle; and
train the dynamic model using the one or more weight-related values.

16. The system of claim 13, wherein the controller is configured to, by the processor:
receive, from the sensor system, a first longitudinal acceleration value of the vehicle, a first drive force value of the vehicle, and a first brake pressure value of the vehicle all sensed at a first time while the vehicle is being driven;
receive, from the sensor system, a second longitudinal acceleration value of the vehicle, a second drive force value of the vehicle, and a second brake pressure value of the vehicle all sensed at a second time, wherein a velocity of the vehicle is the same at the first time and the second time while the vehicle is being driven; and
estimate the dynamic estimated weight value of the vehicle using the dynamic model and the first longitudinal acceleration value, the first drive force value, the first brake pressure value, the second longitudinal acceleration value, the second drive force value, and the second brake pressure value, wherein the dynamic model includes a variational-based vehicle longitudinal model.

17. The system of claim 16, wherein the variational-based vehicle longitudinal model is configured to use a subset of the dynamic sensor data that is obtained while the velocity of the vehicle is greater than a threshold velocity and while the vehicle is traveling in a straight, forward direction.

18. The system of claim 13, wherein the controller is configured to, by the processor, receive, from the sensor system, one or more external weight values associated with objects separate from and supported by the vehicle, and the dynamic model is configured to accommodate for the one or more external weight values.

19. A vehicle comprising:
a body;
a suspension system configured to support the body;
a sensor system having one or more sensors configured to sense measurable conditions internal and external to the body;
a display device configured to generate a visual display; and
a controller operably coupled to the sensor system and the display device, the controller configured to, by a processor:
receive, from the sensor system, static sensor data sensed while the vehicle is stationary and coupled to a trailer and dynamic sensor data while the vehicle is being driven and not coupled to the trailer, wherein the static sensor data includes a deflection value associated with the suspension system;
estimate, while the vehicle is stationary, one or more weight-related parameter values using a suspension model and the static sensor data;
determine degradation of the suspension system over time using a suspension sag estimation model and the dynamic sensor data;
update the suspension model to accommodate for the degradation of the suspension system; and
display the one or more weight-related parameter values on the visual display, wherein the one or more weight-related parameter values include a total vehicle weight value, a tongue load value of the trailer, and a front/rear axle loads restoration value.

20. The vehicle of claim 19, wherein the controller is configured to, by the processor:
estimate a static estimated weight value of the vehicle using the suspension model;
estimate a dynamic estimated weight value of the vehicle with a dynamic model and the dynamic sensor data, wherein the dynamic sensor data includes an acceleration value of the vehicle; and
determine a fused estimated weight value of the vehicle by fusing the static estimated weight value and the dynamic estimated weight value,
wherein the suspension sag estimation model is configured to compare the fused estimated weight value and the static estimated weight value.

* * * * *